United States Patent [19]
Koch et al.

[11] Patent Number: 5,291,270
[45] Date of Patent: Mar. 1, 1994

[54] METHOD AND ARRANGEMENT FOR DETECTING EDGES AND BORES OF A WORKPIECE WITH AN OPTICAL PROBE HEAD

[75] Inventors: Klaus-P. Koch; Ralf Peter, both of Aalen, Fed. Rep. of Germany

[73] Assignee: Carl-Zeiss-Stiftung, Heidenheim, Fed. Rep. of Germany

[21] Appl. No.: 856,127

[22] Filed: Mar. 23, 1992

[30] Foreign Application Priority Data

Mar. 22, 1991 [DE] Fed. Rep. of Germany ....... 4109483

[51] Int. Cl.⁵ .............................................. G01B 11/00
[52] U.S. Cl. .................................. 356/372; 356/375; 356/378; 356/376; 250/561
[58] Field of Search ............... 356/372, 375, 376, 377, 356/378, 241; 250/560-563, 571, 572

[56] References Cited

U.S. PATENT DOCUMENTS

| | | | |
|---|---|---|---|
| 4,209,252 | 6/1980 | Arditty et al. | 356/377 |
| 4,721,388 | 1/1988 | Takagi et al. | 356/376 |
| 4,790,660 | 12/1988 | Ito et al. | 356/376 |
| 4,822,163 | 4/1989 | Schmidt | 356/4 |
| 4,838,696 | 6/1989 | Pryor | 356/375 |
| 4,934,810 | 6/1990 | Nägele et al. | 356/376 |

FOREIGN PATENT DOCUMENTS

| | | |
|---|---|---|
| 0125165 | 11/1984 | European Pat. Off. |
| 0368032 | 5/1990 | European Pat. Off. |
| 2597018 | 10/1987 | France |
| 2082105 | 3/1990 | Japan |
| 0188307 | 8/1991 | Japan ................. 356/378 |

OTHER PUBLICATIONS

"MV-300 Machine Vision" by Perceptron, The Machine Vision Company, 1985.

Primary Examiner—Richard A. Rosenberger
Assistant Examiner—Hoa Q. Pham
Attorney, Agent, or Firm—Walter Ottesen

[57] ABSTRACT

The invention is directed to a method and arrangement for detecting edges and bores on a workpiece with an optical probe head. The optical probe head is guided with constant beam power over the workpiece surface for detecting the edges and bores. In addition to the distance signal of the probe head, the intensity of the radiation backscattered from the workpiece is determined and stored. With the intensity values simultaneously stored with the coordinates of the workpiece surface in the region of the edges and bores, the coordinates of the edges and bores are determined from abrupt changes of the trace of the intensity.

13 Claims, 3 Drawing Sheets

METHOD AND ARRANGEMENT FOR DETECTING EDGES AND BORES OF A WORKPIECE WITH AN OPTICAL PROBE HEAD

BACKGROUND OF THE INVENTION

Switching mechanical probe heads are primarily used when measuring a motor vehicle chassis with the aid of coordinate measuring apparatus for measuring the position of edges, bores, gap widths and the like. In contrast, for the measurement of the surface contours of such workpieces, optical measuring probe heads such as so-called triangulation probes are often also used. These triangulation probes supply a measurement signal proportional to the distance of the probe from the workpiece surface. Accordingly, time consuming probe exchange operations are necessary when the chassis is to be completely measured with the mechanical probe head attached to the measuring arm of the coordinate measuring apparatus being exchanged for an optical probe head and vice versa.

In addition, purely optical chassis measurement methods are also known. In these methods, larger areas of the workpiece are imaged and the workpiece image is processed with the methods of image processing. These evaluation methods are however very complex and offer only a limited precision of the coordinate measurement. Furthermore, a two-dimensional image sensor is required for this purpose.

Finally, it is also known to measure a chassis with a special optical probe head which emits a fanned light beam and the coordinate values of the workpiece surface including any edges and bores are obtained according to the light-intersection method. Such an optical probe head is, for example, known under the name "Perceptron-Contour-Sensor" and is described in a publication of the Perceptron Company entitled "MV-300 Machine Vision", page 11. This optical probe head also utilizes a two-dimensional image sensor in order to evaluate the shape of the light intersection at bores and edges. Furthermore, an additional rotational axis in the laser direction is required for the operation of this sensor so that the emitted fanned light can be adjusted perpendicularly to the edge to be measured. When an additional rotational axis is needed at this location, then the condition must be considered that optical probe heads are often attached to the measuring arm of the coordinate measuring apparatus by means of a so-called rotation-pivot unit so that spatially inclined workpiece features can be measured in a simple manner. With its two rotational axes, this rotation-pivot unit expands the coordinate measuring apparatus into a five-axis apparatus. However, a still further axis (a sixth axis) is needed for aligning a light intersection to an edge on the workpiece.

A further embodiment of the above-mentioned probe is disclosed in U.S. Pat. No. 4,822,163. The light intersection of the probe described there is wedge-shaped and extends in several directions whereby it is no longer necessary that the probe must be rotated about the sixth axis.

However, the last-mentioned probe requires also a two-dimensional image sensor and relatively complex image processing electronics.

SUMMARY OF THE INVENTION

It is an object of the invention to provide a method which permits not only contours of workpiece surfaces to be measured simply, rapidly and with the highest possible precision while using a simple optical probe head, but also the position of edges and bores on the workpiece.

The above object is realized with the method of the invention for detecting edges and bores on a workpiece with an optical probe head which emits an optical beam and supplies a signal corresponding to the distance to the workpiece, the signal being derived from the position and shape of the beam spot occurring on the workpiece and the probe head being attached to a measuring arm of a coordinate measuring apparatus. The method of the invention includes the steps of: guiding the probe head with the measuring arm along a pregiven path (s) over the surface of the workpiece to be measured thereby obtaining measured distance values (z') of the optical probe head and path signals ($x_o$, $y_o$, $z_o$) of the coordinate measuring apparatus; determining the coordinates (x, y, z) of the scanned workpiece surface from the measured distance values (z') and the path signals ($x_o$, $y_o$, $z_o$) and then storing the coordinates (x, y, z); determining the intensity I of the radiation for the coordinates (x, y, z) and likewise storing the intensity values $I_{(x, y, z)}$, said radiation being backscattered from the workpiece and received by the probe head; and, evaluating the trace of the intensity values I over the measured coordinates (x, y, z) in a computer in such a manner that the position coordinates ($x_k$, $y_k$, $z_k$) of edges and bores are determined from abrupt changes of the intensity value I.

In lieu of determining the intensity I of the radiation recited above, the intensity I of the radiation emitted by the probe head can be determined for the coordinates (x, y, z).

Only a simple probe head is needed for carrying out the method of the invention which projects a point-shaped beam spot on the workpiece to be measured. Such probe heads operate either according to the autofocus principle or according to the triangulation principle. Also, such probe heads are equipped either with a difference photodiode or a quadrant detector or they are equipped with a lateral effect photodiode or a detector array operating as a photo-sensitive receiver. Furthermore, such probe heads are relatively economical and the electronics required for the evaluation of the receiver signal are not complex.

An additional (sixth) rotational axis for aligning the optical probe head is likewise not required and the beam spot, which is emitted by the probe head, can be guided in any desired path by the coordinate measuring apparatus on which the optical probe head is mounted over the workpiece.

When compared to the measurement method carried out up to now with such probe heads, it is only necessary to obtain, in addition to the distance signal, an intensity signal which describes the intensity, for example, of the light backscattered from the object or workpiece and to store this signal together with the coordinate measurement values in the memory of the computer which in any event is already there. Accordingly, and without much additional effort, contours as well as irregularities such as holes and bores as well as edges on the workpiece can be measured with the same optical probe head. Also, the exchange of a second mechanical probe which has been conventional up to now is no longer necessary for the last-mentioned measuring task.

The intensity of the radiation emitted by the optical probe head is often controlled when measuring contours of workpieces in order to adapt the intensity to different scatter characteristics of workpiece surfaces and to obtain a constant level at the receiver in the probe head. In contrast, it is advantageous in the measurement of edges and bores to maintain the intensity of the radiation emitted by the probe head constant since then the backscattering characteristics of the workpiece disturbed by the edge or the bore can be applied as a criteria for the determination of the coordinates of the bore. Accordingly, it is advantageous to proceed in that the integral intensity of the light received by the probe head is stored in dependence upon the position of the scanned object surface or workpiece surface and to determine the position coordinates of the edge or bore from abrupt changes of the intensity values. The storage of the integral scattered light distribution provides a significantly more stable and low-noise signal trace compared to a peak detection of the scattered light distribution.

For the distance signal of the optical probe head or the coordinate values obtained therefrom, it is also advantageous, at least in the area of the edges and bores, to obtain the coordinate values by means of filtering or interpolation over the bores/edges. In this way, the coordinate values can be generated also in the region of the bore edges and the intensity values, which are present there and which the optical probe head detects, can be appropriately assigned.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
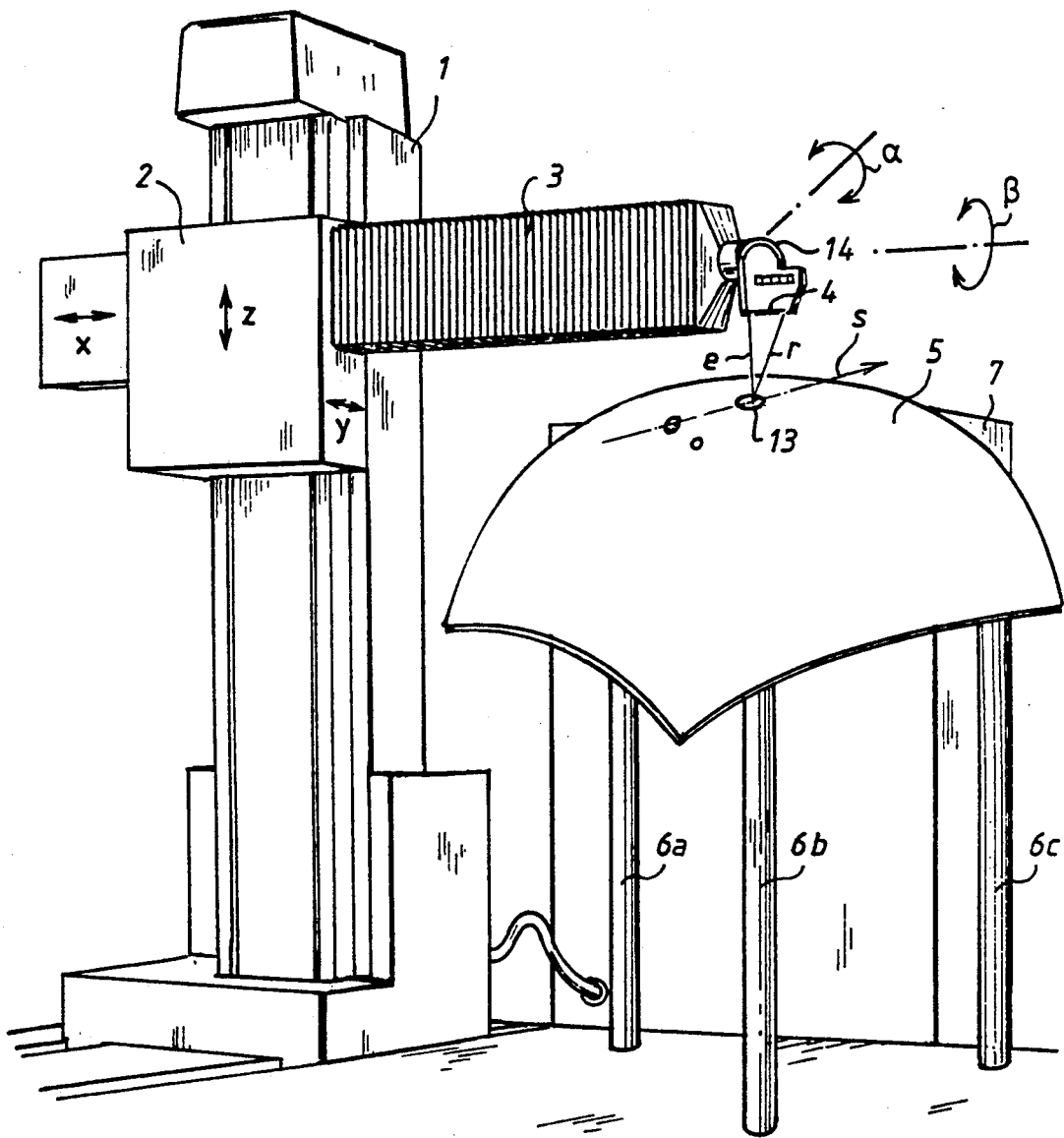
FIG. 1 is a perspective simplified view of a coordinate measuring apparatus having an optical probe head mounted thereon during a typical measuring task.

The coordinate measuring apparatus shown in FIG. 1 is of a stand configuration and includes a column 1 which can be moved in the horizontal direction of the arrow (y). The measuring arm 3 of the apparatus is held in a sled 2 movable in the vertical direction of the arrow (z). The measuring arm 3 itself is displaceable horizontally in the second coordinate (x) and carries an optical probe head 4 at its forward end. The optical probe head 4 operates pursuant to the triangulation principle. The optical probe head can, for example, be of the kind described in U.S. Pat. No. 4,934,810 incorporated herein by reference. The probe head is attached to the measuring arm 3 via a rotation-pivot unit 14. The probe head 4 can be rotated or pivoted about the two axes identified by ($\alpha$) and ($\beta$) with the aid of the unit 14.

Reference numeral 7 identifies the control computer of the coordinate measuring apparatus. The workpiece 5 to be measured can, for example, be a part of a chassis and is held in the measuring range of the apparatus by three holders (6a, 6b, 6c).

The surface of the workpiece 5 is scanned in the usual manner to check its shape in that the workpiece surface is passed over in a pregiven path and the elevation coordinate ($z_0$), that is the vertical position of the measuring arm 3 is so moved that the distance ($z'$) between the probe head 4 and the workpiece surface remains in the permissible measurement range of the triangulation probe head 4. At the same time, and during this operation, the intensity of the beam (e) emitted by the triangulation probe head is so controlled that the light quantity per unit of time remains constant. This light quantity per unit of time is received via the imaging beam path (r) by the detector 8, a diode array or a CCD-array, and is independent of the scatter characteristics of the surface of the workpiece.

Figure 2:
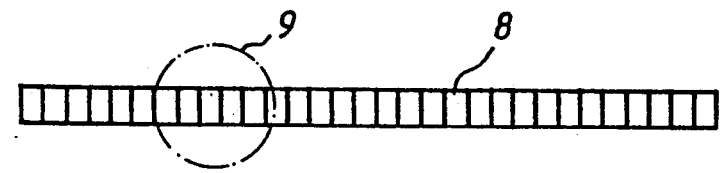
FIG. 2 is a simplified schematic which shows the sensor used in the probe head of FIG. 1.

The distance measurement signal ($z'$) (FIG. 4) of the triangulation probe head 4 is obtained by converting the position of the beam spot 9 imaged on the receiver array 8 in the probe head 4 according to known trigonometric relationships (see FIG. 2).

This method of checking shapes becomes ineffective when edges, deeper bores, holes and the like are passed over since, at these locations, there is a movement out of the distance measuring range of the probe head 4 and also no radiation returns to the receiver array 8 in the probe head. On the other hand, it is however important for many measuring tasks to fix the precise location of the edges or bores.

Figure 6:
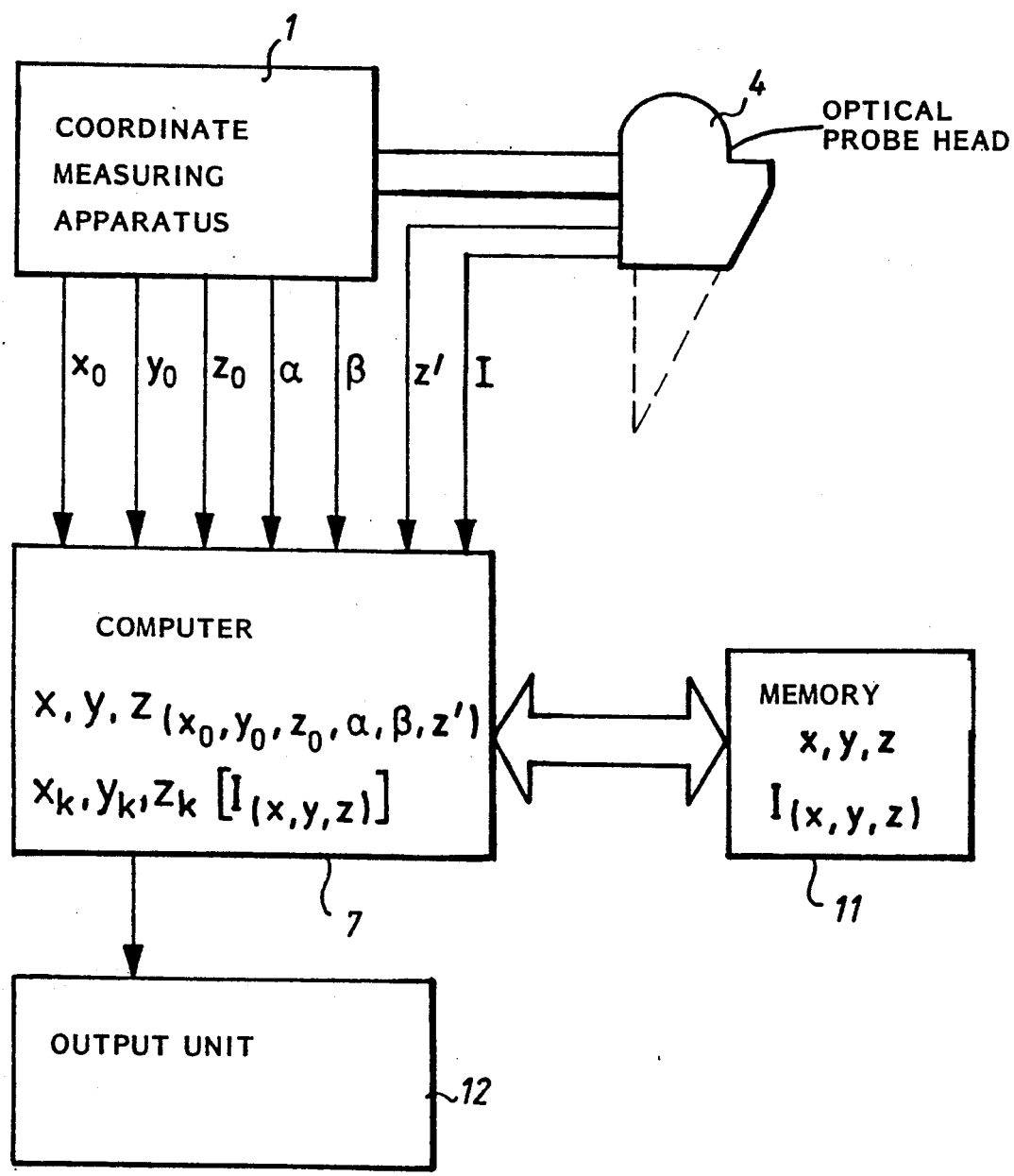

A switchover to a second mode of operation takes place for this purpose. Here, before beginning the scan of the workpiece, the surface scatter characteristics of the workpiece 5 are determined automatically in a teach-in operation. The measuring arm 3 is moved to various points of the workpiece surface and the backscattered intensity at a pregiven emitted power is measured and from this an adapted mean radiation intensity is derived to which the probe head 4 is then set in the following actual measuring operation. Thereafter, and as shown in FIG. 1, the workpiece surface over the bores 13 is scanned. The distance measurement signal ($z'$) supplied by the probe head together with the position signals ($x_0$, $y_0$, $z_0$), which are derived from the measurement scales in the three axes of the coordinate measurement apparatus, and the angle values $\alpha$ and $\beta$, which are supplied by the encoders of the rotation-pivot unit, are supplied to the computer 7 of the coordinate measuring apparatus which then computes the coordinates (x, y, z) therefrom. This is shown in the simplified block diagram of FIG. 6.

Figure 4:
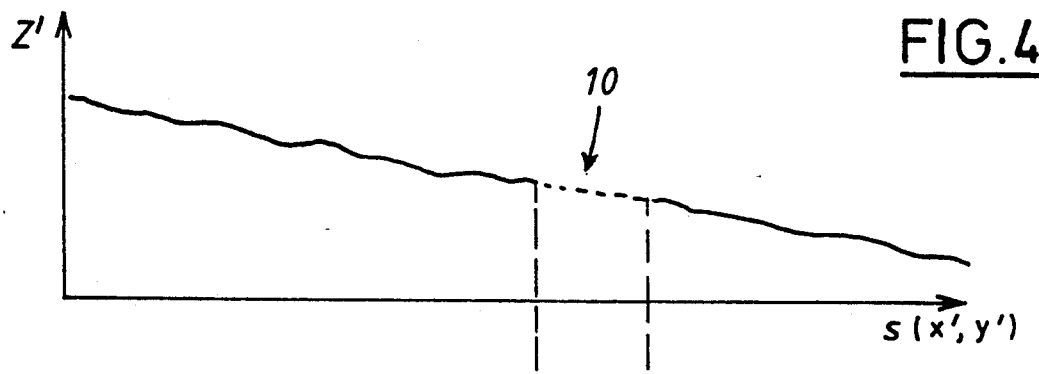
FIG. 4 is a plot of the distance measurement values of the optical probe head of FIG. 1 plotted against the scanning path over a bore of the workpiece.

Distance measurement values ($z'$) which the probe head 4 does not supply in the region of the bore 13 are generated by interpolating the distance measurement values obtained forward of and rearward of the bore 13 as shown in FIG. 4 by the broken line continuation of the distance measurement values in the region of the bore 13.

Figure 3:
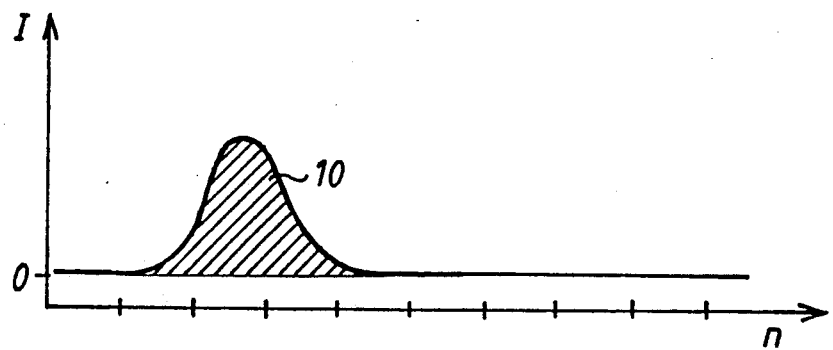
FIG. 3 is a diagram which shows the intensity distribution of the beam spot imaged on the sensor of FIG. 2 with the beam spot being plotted in the direction of the sensor.
Figure 5:
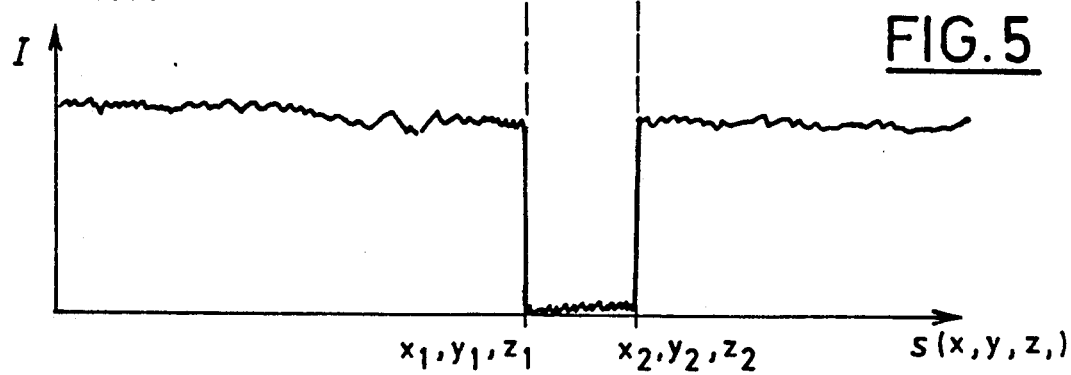
FIG. 5 is a diagram showing the intensity values of the backscattered light plotted against the coordinates of the scanning path; and, FIG. 6 is a block diagram showing the essential components of the arrangement for carrying out the method of the invention.

In this mode of operation, the intensity measurement values in the integral overall intensity 10 of the entire radiation (see FIG. 3) incident in the region of the spot on the detector array 8 are measured simultaneously with the detection of the distance measurement values (z'). These intensity values together with the coordinates (x, y, z) of the scanned workpiece surface are stored in the memory 11 of the computer 7 as intensities $I_{(x, y, z)}$. Within the computer, the intensity values I shown in FIG. 5 therefore are formed as a function of the coordinates (x, y, z) at which the beam axis of the probe head 4 intersects with the surface of the workpiece along the scanning path.

In this way, a digital intensity signal referred to the coordinates is obtained with a very high grey value resolution dependent upon the dynamics of the sensor array 8 and the integral formation. The intensity signal, which falls abruptly in the region of the bore 13, is evaluated in the computer with the aid of known edge filtering and correlation methods and, in the course of this evaluation, the coordinates of the bore edge ($x_k$, $y_k$, $z_k$) are derived from the intensity measurement values. In this way, in accordance with the preselected scanning speed, edge positions can be measured with very high precision in three dimensions and with a precision which lies far below the diameter of the beam spot occurring on the workpiece.

The edge positions computed in this manner are recorded in the output unit 12 which, for example, is a printer.

Thus, a preferred embodiment according to the invention is an arrangement for detecting edges and bores of a workpiece without contact with the workpiece. The arrangement includes: a coordinate measuring apparatus 1 having a measuring arm 3; means for positioning the measuring arm 3 in three spatial directions; means for generating position signals ($x_0$, $y_0$, $z_0$) determining the position of the measuring arm in the three spatial directions; an optical probe head 4 mounted on the measuring arm 3 for supplying the signal (z') corresponding to the distance of the probe head 4 from the workpiece 5; computer means 7 for computing coordinate values (x, y, z) for points on the workpiece 5 from the position signals ($x_0$, $y_0$, $z_0$) and the distance signal (z'); means 8 for measuring the intensity of the radiation backscattered from the workpiece 5; memory means 11 for storing the measured intensity values $I_{(x, y, z)}$; and, means for determining the coordinates ($x_k$, $y_k$, $z_k$) of the edges and bores from the intensity values $I_{(x, y, z)}$ stored in dependence upon the workpiece coordinates. The means for determining the coordinates ($x_k$, $y_k$, $z_k$) can be an evaluation program.

It is understood that the foregoing description is that of the preferred embodiments of the invention and that various changes and modifications may be made thereto without departing from the spirit and scope of the invention as defined in the appended claims.

What is claimed is:

1. A method of detecting edges and bores on a workpiece with an optical probe head which emits an optical beam and includes a detector to supply a distance signal corresponding to the distance to the workpiece, the signal being derived from the position and shape of the beam spot occurring on the workpiece and the probe head being attached to a measuring arm of a coordinate measuring apparatus, the method comprising the steps of:

guiding the probe head with the aid of the measuring arm along a pregiven path (s) over the surface of the workpiece to be measured thereby obtaining measured distance values (z') of the optical probe head and path signals ($x_0$, $y_{0l}$, $z_0$) of the coordinate measuring apparatus;

determining the coordinates (x, y, z) of points on the scanned workpiece surface from said measured distance values (z') and said path signals ($x_0$, $y_0$, $z_0$) and then storing said coordinates (x, y, z);

utilizing said detector for determining the intensity I of the radiation for the coordinates (x, y, z) and likewise storing the intensity values $I_{(x, y, z)}$, said radiation being backscattered from the workpiece and received by the probe head; and, determining the coordinates ($x_k$, $y_k$, $z_k$) of said edges and bores from said intensity values $I_{(x, y, z)}$ obtained from said detector and stored in dependence upon the workpiece coordinates.

2. The method of claim 1, wherein the intensity of the radiation emitted by the optical probe head is held constant and the intensity of radiation received by the probe head is determined.

3. The method of claim 2, wherein the integral intensity of the radiation received by the probe head is determined and stored.

4. The method of claim 1, wherein the intensity of the radiation emitted by the probe head is controlled so that said intensity of the received radiation is as constant as possible and the intensity of the emitted radiation for the individual coordinates is stored.

5. The method of claim 1, wherein the coordinate values in the region of the edges and bores obtained from the distance signal of the optical probe head are obtained by filtering or interpolation.

6. A method of detecting edges and bores on a workpiece with an optical probe head which emits an optical beam and includes a detector supplying a distance signal corresponding to the distance to the workpiece, the signal being derived from the position and shape of the beam spot occurring on the workpiece and the probe head being attached to a measuring arm of a coordinate measuring apparatus, the method comprising the steps of:

guiding the probe head with the aid of the measuring arm along a pregiven path (s) over the surface of the workpiece to be measured thereby obtaining measured distance values (z') of the optical probe head and path signals ($x_0$, $y_0$, $z_0$) of the coordinate measuring apparatus;

determining the coordinates (x, y, z) of the scanned workpiece surface from said measured distance values (z') and said path signals ($x_0$, $y_0$, $z_0$) and then storing said coordinates (x, y, z);

utilizing said detector for determining the intensity I of the radiation for the coordinates (x, y, z) and likewise storing the intensity values $I_{(x, y, z)}$, said radiation being emitted by the probe head; and, determining the coordinates ($x_k$, $y_k$, $z_k$) of said edges and bores from said intensity values $I_{(x, y, z)}$ obtained from said detector and stored in dependence upon the workpiece coordinates.

7. The method of claim 6, wherein the intensity of the radiation emitted by the optical probe head is held constant and the intensity of radiation received by the probe head is determined.

8. The method of claim 7, wherein the integral intensity of the radiation received by the probe head is determined and stored.

9. The method of claim 6, wherein the intensity of the radiation emitted by the probe head is controlled so that said intensity of the received radiation is as constant as possible and the intensity of the emitted radiation for the individual coordinates is stored.

10. The method of claim 6, wherein the coordinate values in the region of the edges and bores obtained from the distance signal of the optical probe head are obtained by filtering or interpolation.

11. An arrangement for detecting edges and bores of a workpiece without contact with the workpiece, the arrangement comprising:

a coordinate measuring apparatus having a measuring arm;

means for positioning said measuring arm in three spatial directions;

means for generating position signals ($x_0$, $y_0$, $z_0$) determining the position of said measuring arm in said three spatial directions;

an optical probe head mounted on said measuring arm for scanning the workpiece with radiation which is backscattered from the workpiece and including a detector for receiving the backscattered radiation and for supplying a signal ($z'$) corresponding to the distance of said probe head from the workpiece;

computer means for computing workpiece coordinate values (x, y, z) for points on the workpiece from said position signals ($x_0$, $y_0$, $z_0$) and the distance signal ($z'$);

said detector being adapted for measuring the intensity of the radiation backscattered from the workpiece;

memory means for storing the measured intensity values $I_{(x, y, z)}$; and, means for determining the coordinates ($x_k$, $y_k$, $z_k$) of said edges and bores from said intensity values $I_{(x, y, z)}$ stored in dependence upon the workpiece coordinate values (x, y, z).

12. The arrangement of claim 11, said means for determining said coordinates ($x_k$, $y_k$, $z_k$) comprising a computer program which senses abrupt changes of the intensity values $I_{(x, y, z)}$.

13. The arrangement of claim 11, further comprising a rotation-pivot unit for attaching said optical probe to said measuring arm.

* * * * *

UNITED STATES PATENT AND TRADEMARK OFFICE
CERTIFICATE OF CORRECTION

PATENT NO. : 5,291,270
DATED : March 1, 1994
INVENTOR(S) : Klaus Koch, et al

It is certified that error appears in the above-indentified patent and that said Letters Patent is hereby corrected as shown below:

In column 5, line 67: delete "$(x_0, y_0, z_0)$" and substitute -- $(x_0, y_0, z_0)$ -- therefor.

Signed and Sealed this

Twenty-first Day of June, 1994

Attest:

BRUCE LEHMAN

*Attesting Officer*  *Commissioner of Patents and Trademarks*